Patented Sept. 16, 1930

1,775,670

UNITED STATES PATENT OFFICE

WILLIAM R. CHAPIN, OF INDIANAPOLIS, INDIANA

METAL CEMENT

No Drawing.   Application filed April 29, 1929.   Serial No. 359,179.

This invention relates to cementing compound to be used particularly in joining metals, and especially for cementing steel, the object of the invention being to secure not only a cement which will secure perfect union between the metals joined, but which will form a union less noticeable than is true with known cements, and which will be less expensive and at the same time provide a more securing union between the parts.

For the purposes of this compound I preferably use silico-manganese, borax glass and ferro-silicon. While other proportions might result in a successful product, I have secured the best results when using the elements in the proportion of between eighty and eighty-five per cent of silico-manganese, ten per cent of ferro-silicon and from five to ten per cent of borax glass. It is well known in the trade that silico-manganese contains approximately seventy per cent manganese, twenty per cent silicon and most of the remainder iron. The ferro-silicon used in my compound is what is known in the trade as fifteen per cent ferro-silicon containing aproximately eighty-five per cent iron and fifteen per cent silicon. These elements are all ground to a fine powder before mixing, and then are thoroughly mixed to insure a strictly uniform compound throughout. The surfaces to be joined are machined or ground until they are flat, after which they are cleaned and a layer of the compound approximately $\frac{1}{32}$ of an inch thick is placed between them. The parts are then placed together and heated while held together, to a temperature of approximately 2300 degrees Fahrenheit. Where large pieces are to be cemented the whole is first placed in a pre-heater which is maintained at a temperature below the cementing temperature, generally about 1500 to 1600 degrees Fahrenheit. They are then carefully removed from the heat and the surfaces to be joined are pressed tightly together in order to remove surplus compound. They are then allowed to cool under pressure until such time as the cement has set in the joint and then removed from the pressure and quenched, the temper being drawn afterwards to suit the work. The quenching, however, is applied only to high speed steel and other steels which require quenching to develop their maximum hardness, but stellite and other special alloys which do not require quenching are removed from the press and allowed to cool naturally.

My cement may be used not only for joining together any two steels, such as high speed steel to carbon steel, or stellite to carbon steel, but may be used also to cement tungsten carbide, known as carboloy, to steel. It may also be used to cement a number of other well known cutting materials now on the market to a tough carbon base.

By the use of this compound I have found that black spots in the joints commonly resulting from the use of other compounds are avoided and a stronger and better looking joint results. It is believed this result follows from the fact that the borax glass content is reduced to a very small percentage of the whole, while the addition of the other elements of the compound results in a cement which flows freely and completely makes up all inequalities in the joint, such as the low places in the machining of high speed metal or carbon steel preparatory to cementing. I have found that by the use of the compound containing borax glass substantially in excess of ten per cent black or nearly black beads which form the black spots in the joint, result, whereas with the cement made in accordance with the above formula this objectionable feature is overcome.

It will be obvious to those skilled in the art that various changes may be made in my invention without departing from the spirit of the invention, and I therefore do not limit myself to those proportions set forth in the specification, but only such as set forth in the appended claims.

Having thus fully described my said invention, what I claim as new and desire to secure by Letters Patent, is:

1. A cement compound consisting of approximately eighty per cent silico-manganese, ten per cent of fifteen per cent ferro-silicon and ten per cent powdered borax glass, substantially as set forth.

2. A cement compound comprising between five and ten per cent of powdered borax glass, approximately ten per cent of fifteen per cent ferro-silicon, and the remainder of silico-manganese, substantially as set forth.

3. A compound adapted to be used in joining materials comprising a mixture of approximately five per cent borax glass, ten per cent of fifteen per cent ferro-silicon and eighty-five per cent silica-manganese, substantially as set forth.

In witness whereof, I have hereunto set my hand at Indianapolis, Indiana, this 22nd day of April, A. D. nineteen hundred and twenty-nine.

WILLIAM R. CHAPIN.